Aug. 31, 1965

G. R. SANTOS 3,203,672

LOAD INDICATING DEVICE

Filed Feb. 9, 1962

INVENTOR.
GERARD SANTOS
BY
*A. H. Golden*
ATTORNEY

Aug. 31, 1965    G. R. SANTOS    3,203,672
LOAD INDICATING DEVICE
Filed Feb. 9, 1962    2 Sheets-Sheet 2
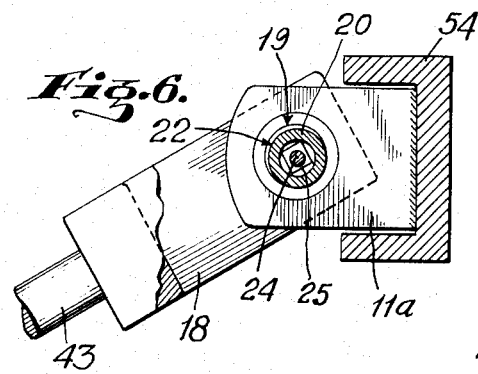
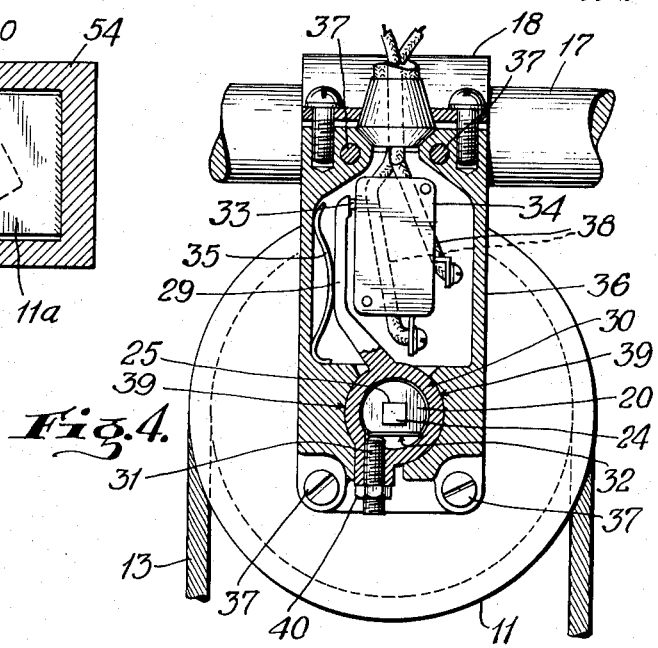
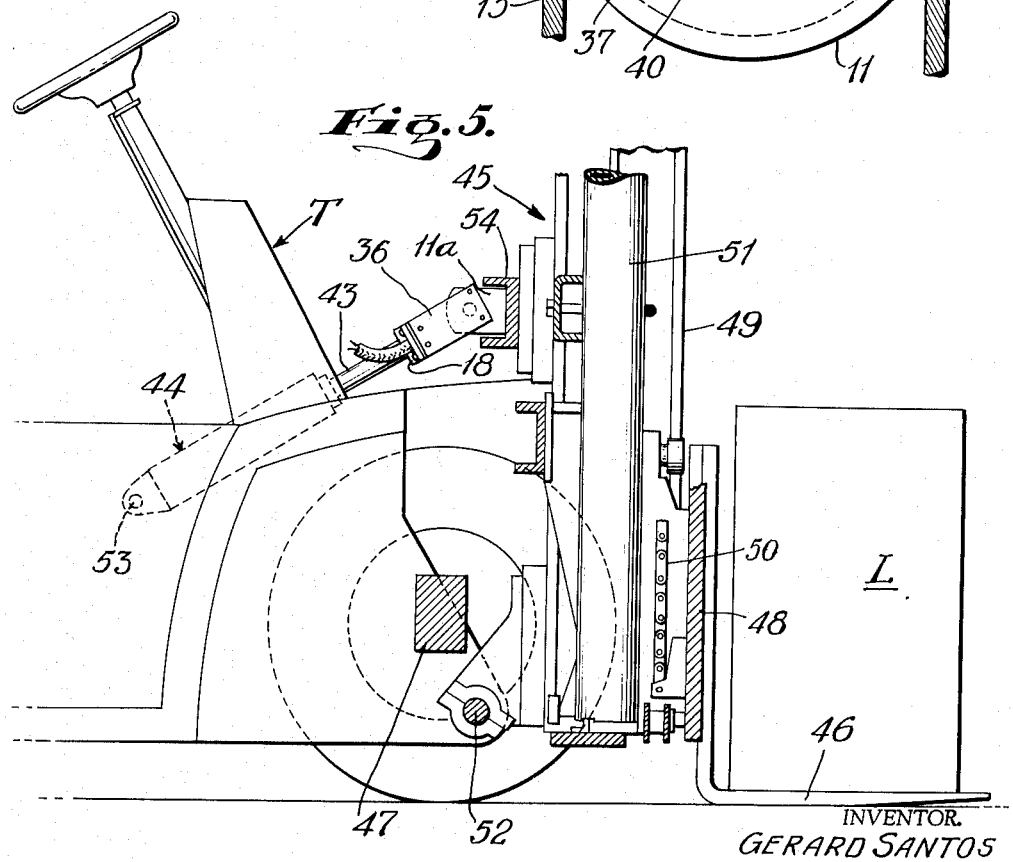
INVENTOR.
GERARD SANTOS
BY
ATTORNEY United States Patent Office
3,203,672
Patented Aug. 31, 1965

3,203,672
LOAD INDICATING DEVICE
Gerard R. Santos, Levittown, Pa., assignor, by mesne assignments, to Yale and Towne, Inc., New York, N.Y., a company of Ohio
Filed Feb. 9, 1962, Ser. No. 172,295
10 Claims. (Cl. 254—173)

This invention relates to a load indicating device for actuating a control switch or otherwise indicating when a predetermined load has been imposed on the device.

The purpose of the invention is to provide a device of this type which is simple, compact, rugged and relatively inexpensive, but which at the same time is extremely sensitive and requires only slight movement of the detecting parts to actuate the control switch or other indicating structure.

In accordance with the invention, the device includes a pivot member having cylindrical surfaces which are slightly eccentric to each other. A first load receiving member is pivotally mounted on one cylindrical surface while a second load receiving member is pivotally mounted on the other cylindrical surface. Because of the eccentricity of the cylindrical surfaces, when a load is applied in opposite directions to the two load receiving members, a force couple is applied to the pivot member by the load receiving members tending to rotate the pivot member. While this rotation is small, it is sufficient to operate a control switch or otherwise indicate a predetermined rotation of the shaft. The load at which the pivot member will be rotated is determined by the strength of a resilient yielding connection, such as a torsion bar, between the pivot member and one of the load receiving members, which yields to allow rotation of the pivot member only after a predetermined load has been applied to the load receiving members.

Because of the pivotal mounting of the load receiving members on the pivot member, one of the load receiving members may rotate relatively to the other load receiving member without affecting the load indicating function of the device. For this reason, the device of the invention may be used as a pivotal connection or mounting for structural parts of the apparatus in which the device is used. Thus, the device is particularly useful in electric hoists as it may be used as a pivotal mounting for one of the sheaves of the hoist, while at the same time providing an overload switch actuating device for cutting off the electric hoist motor if an overload is encountered. The device may also be used as a pivotal connection for the tilt ram of an industrial fork truck, while at the same time providing an overload indicator for indicating the presence of an excessive load on the forks which would otherwise tend to tip the truck about its front axle.

The invention and its advantages having been broadly desscribed, a more detailed description is given hereafter by reference to the accompanying drawings, wherein:

FIG. 4 is a sectional view taken on the line 4—4 of FIG. 2 to show the switch actuating mechanism;

FIG. 5 is a side elevational view, partly in section, showing the device of the invention used as a pivotal connection for the tilt ram of an industrial truck; and FIG. 6 is a sectional view of the device as used in FIG. 5.

Figure 1:
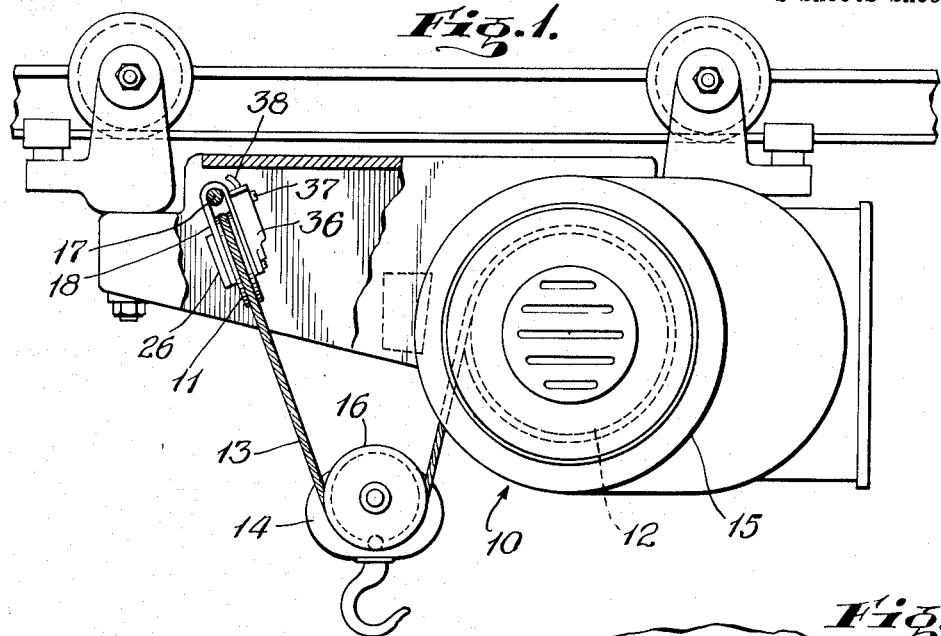
FIG. 1 is a side elevational view of an electric hoist incorporating the device of the invention as a mounting for an equalizing sheave.

Referring to the drawings and in particular to FIG. 1, the device of the invention is shown applied to an electric hoist 10 to provide the dual function of a mounting for an equalizing sheave 11 and an overload switch actuating device to cut off the electric hoist motor if an overload is encountered. The particular hoist disclosed, except for the equalizing sheave 11, is of the general type disclosed in United States Patent No. 2,335,568 and includes a grooved hoisting drum 12 on which a hoist cable 13 is wound or unwound to raise or lower a load block 14. The drum 12 is rotated through gears, enclosed in a casing 15, by means of an electric motor (not shown) which is mounted on the opposite side of the hoist 10 from the casing 15.

In the particular arrangement shown, the cable 13 is doubled with the two free ends thereof both connected to the drum 12. The two runs of the cable 13 extend from the drum 12 around a pair of sheaves 16 provided on the load block 14, and the opposite looped end of the cable extends around the equalizing sheave 11. The equalizing sheave 11 is adapted to rotate as necessary to maintain the tension in the two runs of the cable equalized.

The hoist 10 is provided with a transverse shaft 17 and the equalizing sheave 11 is pivotally mounted on the shaft 17 by means of a clevis member 18 so that the equalizing sheave 11 may pivot about the shaft 17 as the load block 14 is raised and lowered. Any load on the load block 14 is transmitted through the looped end of the cable 13 to the equalizing sheave 11 and the reaction force transmitted through the clevis member 18 and shaft 17 to the hoist chassis. As will be described in detail, the clevis member 18 forms one of the load receiving members of the load detecting device of the invention, while the equalizing sheave 11 forms the other load receiving member.

Figure 2:
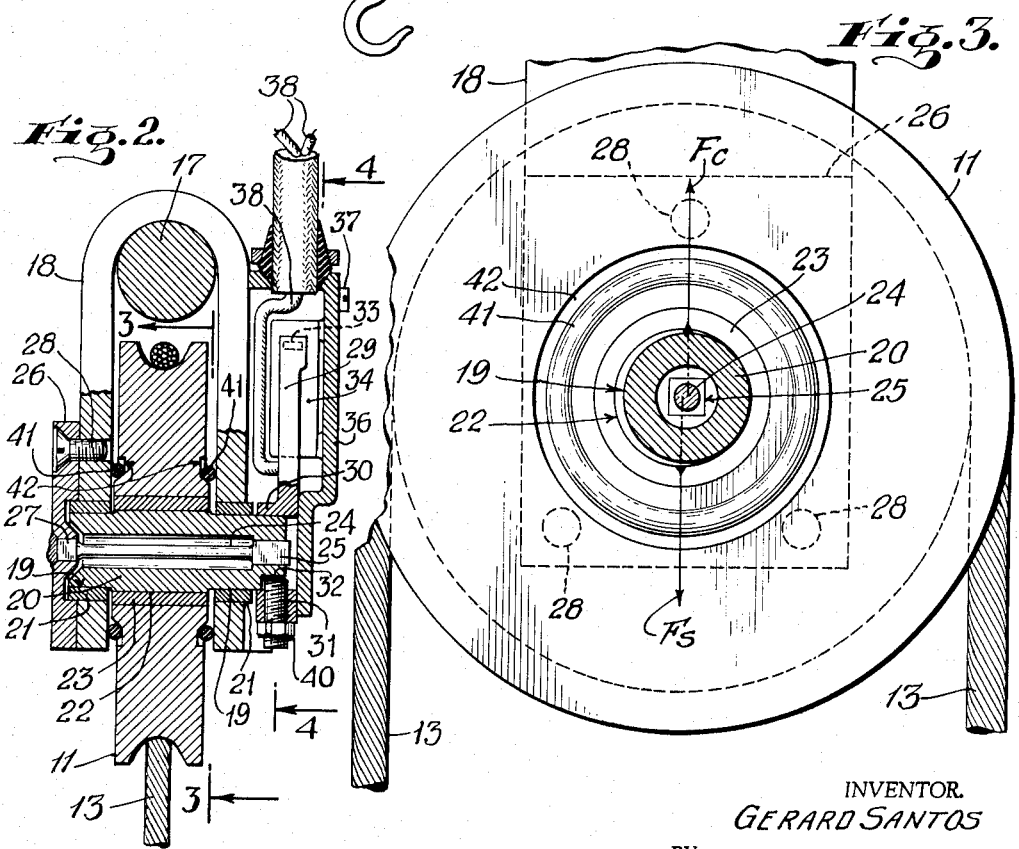
FIG. 2 is a sectional view of the device as shown in FIG. 1.
Figure 3:
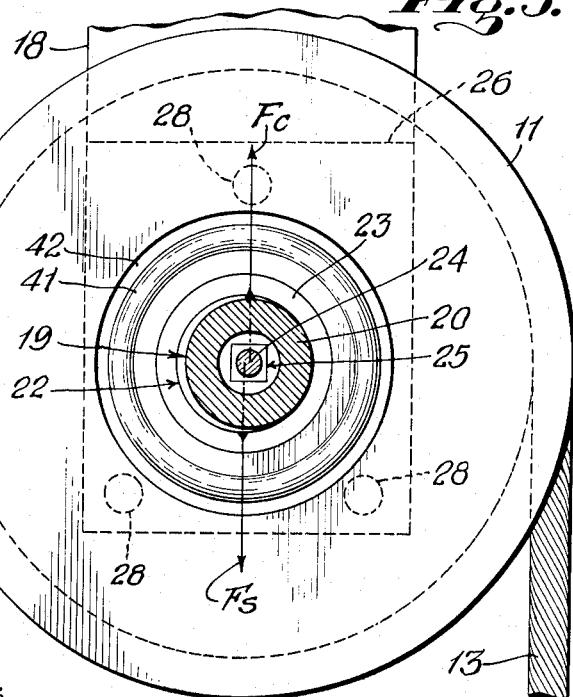
FIG. 3 is an enlarged sectional view taken on the line 3—3 of FIG. 2 to more clearly show the eccentric surfaces of the pivot member.

As best shown in FIG. 2, the legs of the clevis member 18 are rotatably mounted on cylindrical end surfaces 19 of a shaft or pivot member 20 through suitable bearings 21, while the equalizing sheave 11 is rotatably mounted on a centrally located cylindrical surface 22 of the pivot member 20 through a bearing 23. The cylindrical surface 22, however, is not concentric with the surfaces 19 but rather, in accordance with the invention, is slightly eccentric as best shown in FIG. 3. By this arrangement, the resulting force exerted by the equalizing sheave 11 on the pivot member 20, indicated by the force vector $F_S$ in FIG. 3, is offset relatively to the resulting force exerted by the clevis member 18 on the pivot member 20, indicated by the force vector $F_C$. A force couple is thereby exerted on the pivot member 20 tending to rotate the pivot member in a counter-clockwise direction.

Such rotation of the pivot member 20 is normally resisted by means of a torsion bar 24 which is keyed at one end to the pivot member 20 by means of a square end 25 and is rigidly secured and keyed at the opposite end to a plate 26 by means of a square end 27. The plate 26 in turn is secured to one leg of the clevis member 18 by means of screws 28.

During the handling of normal loads, the torsion bar 24 provides sufficient resistance to prevent turning of the pivot member 20 relatively to the clevis member 18, and holds the pivot member 20 in a position in which the direction of maximum eccentricity between the axes of the surfaces 19 and 22 of the pivot member 20 is at substantially right angles to the forces $F_C$, $F_S$. If however, it is attempted to raise a load which is excessive for the rating or capacity of the hoist, the torsion bar 24 yields torsionally allowing the pivot member 20 to rotate in a counter-clockwise direction as viewed in FIG. 3, under the force couple $F_C$, $F_S$ applied thereto through the clevis member 18 and equalizing sheave 11.

A lever arm 29, best shown in FIGS. 2 and 4, has a hub portion 30 which surrounds an end of the pivot member 20, and an adjustable set screw 31 is threaded through the hub portion 30 in an off-center position with the inner end of the set screw 31 directed toward a flat 32 formed on the end of the pivot member 20. Counter-clockwise rotation of the pivot member 20 resulting from an overload condition is therefore transmitted through the flat 32 and the adjusting screw 31 to the lever arm 29 causing counter-clockwise rotation of the lever arm 29. Counter-clockwise rotation of the lever arm 29 releases a push button 33 of a microswitch 34, which is normally held depressed by the outer end of the arm 29, thereby breaking the circuit to the hoist motor to prevent operation thereof until the overload condition is removed.

When the overload condition is removed, the pivot member 20 is returned to its original position by the torsion bar 24, thereby releasing the lever arm 29 to allow it to be pivoted in the clockwise direction by a leaf spring 35 to again depress the push button 33 of the microswitch 34 and again establish a circuit to the hoist motor. The microswitch 34 is enclosed within a suitable housing 36 which is secured to a leg of the clevis member 18 by screws 37, and wires 38 connect the microswitch 34 to the motor circuit. The hub portion 30 of the lever arm 29 is conveniently mounted for rotation between opposed cylindrical surfaces 39 formed as integral parts of the housing 36. The sensitivity of the device may be quickly and easily adjusted by adjusting the position of the set screw 31 and locking it in an adjusted position by a lock nut 40.

It will be particularly noted that the equalizing sheave 11 is free to rotate relatively to both the pivot member 20 and the clevis member 18 to provide its equalizing function without affecting the load detecting function of the device. Annular seals 41 carried in grooves 42 in the sides of the equalizing sheave engage the inner surfaces of the legs of the clevis member 18 to prevent the entry of foreign matter to the bearings 21 and 23 and the pivot member 20, while still allowing the equalizing sheave 11 to rotate relatively to the clevis member 18.

Referring now to FIG. 5, the overload indicating device of the invention is shown applied to an industrial truck T to provide the dual function of a pivotal connection between the piston rod 43 of a tilt ram 44 and a mast assembly 45 and an overload indicating device to indicate when an excessive load L is applied to the load forks 46 which would tip the truck about the front axle 47 if it were attempted to lift the load.

The truck T is of generally conventional construction with the load forks 46 mounted on a load carriage 48 which is adapted to be elevated on channeled uprights 49 of the mast assembly 45 through chains 50 and a lift ram 51. The mast assembly 45 is mounted on the truck for fore and aft pivotal movement about a lower pivot shaft 52, and the mast structure may be pivoted through operation of the tilt ram 49 which is pivoted to the truck frame at 53. Such tilting movement of the mast structure facilitates the engagement of a load by the forks 46 and allows the forks to be tilted backwardly slightly to stabilize the load on the forks during transit. It will be appreciated that the presence of a load L on the forks 46, when the forks are raised, results in a moment being applied to the mast assembly 45 tending to tilt the mast assembly in a clockwise direction as viewed in FIG. 5. This moment is transmitted to the truck through the tilt ram 44, and if the load is excessive, there is danger of the truck tipping about the front axle 47.

The overload indicating device of the invention as used to indicate the presence of an excessive load L on the forks 46 is essentially the same as that used in the electric hoist as previously described, and the same reference numbers are used for the same parts of the device. Thus, as best shown in FIG. 6, the device includes a clevis member 18, which is rigidly secured to the end of the piston rod 43 and is pivotally mounted on the cylindrical end surfaces 19 provided on the pivot member 20. A plate 11a, corresponding to the equalizing sheave 11, as used in the hoist, is pivotally mounted on the central cylindrical surface 22 of the pivot member 20, and is welded or otherwise rigidly secured to a bracket 54 which in turn is attached to the mast assembly 45.

The device is otherwise identical to the device as used in the hoist and functions in the same manner. Thus, under normal loads, the torsion bar 24 prevents rotation of the pivot member 20 under the force couple applied thereto through the clevis member 18 and the plate 11a. If, however, it is attempted to lift a load on the forks 46 which is excessive for the rating or capacity of the truck, the torsion bar 24 yields torsionally, allowing the pivot member 20 to rotate in a counter-clockwise direction. Such rotation of the pivot member 20 results in the release of the microswitch 34, as in the hoist arrangement previously described. Releasing of the microswitch may be used to actuate a warning light or buzzer or may be used to prevent operation of the pump for supplying fluid under pressure to the lift ram, to thereby prevent lifting of the load by the lift ram 44, until the excessive load is removed.

From the preceding description, it can be seen that there is provided a simple, compact, rugged and relatively inexpensive load indicating device for actuating a control switch, or otherwise indicating when a predetermined load has been imposed on the device. The device is extremely sensitive and requires only slight movement of the detecting parts to actuate the load switch of other indicating structure. Because of these advantages and because the detecting parts may rotate relatively to one another without affecting the detecting function of the device, the device is particularly useful in hoists and industrial trucks as it provides the dual function of a pivotal connection and a load indicating device.

While a particular form of the invention has been shown and described, it will be appreciated that this is for the purpose of illustration and that changes and modifications may be made therein without departing from the spirit and scope of the invention.

I now claim:
1. A load indicating device comprising
 (a) a load shaft mounted for rotation about a predetermined central axis,
 (b) a surface formed on said load shaft with the central axis of said surface offset relatively to said predetermined central axis,
 (c) load means bearing against a portion of said surface which is offset relatively to said predetermined central axis and adapted to apply rotational torque through said offset surface to said load shaft, and
 (d) means resisting rotation of said shaft by said load means acting on said surface.
2. A load indicating device comprising
 (a) a load shaft mounted for rotation on bearings about a predetermined central axis,
 (b) a surface formed on said load shaft between said bearings with the central axis of said surface offset relatively to said predetermined central axis of said bearings,
 (c) load means bearing against a portion of said surface which is offset relatively to said predetermined central axis and adapted to apply rotational torque through said offset surface to said load shaft, and
 (d) means resisting rotation of said shaft by said load means acting on said surface.
3. A load indicating device comprising
 (a) a pivot member having at least two cylindrical surfaces eccentric to each other,
 (b) a first load receiving member pivotally mounted on one of said cylindrical surfaces, (c) a second load receiving member pivotally mounted on the other of said two cylindrical surfaces whereby the application of a load to said first and second load receiving members in opposite directions will tend to rotate said pivot member,
(d) means operatively connected to said pivot member for indicating rotation of said pivot member, and
(e) a torsion bar connecting said pivot member to one of said load receiving members for yieldingly resisting rotation of said pivot member relatively to said one load receiving member until a predetermined load has been applied to said load receiving members.

4. In an industrial truck having a frame, a mast assembly pivotally mounted on said frame for fore and aft tilting movement, a ram for tilting said mast assembly, pivotal connecting means connecting one end of said ram to said mast assembly, and pivotal connecting means connecting the other end of said ram to said truck frame, at least one of said pivotal connecting means comprising
(a) a pivot member having at least two cylindrical surfaces eccentric to each other,
(b) a first attaching member pivotally mounted on one of said two cylindrical surfaces for attachment to the truck frame or mast assembly,
(c) a second attaching member pivotally mounted on the other of said two cylindrical surfaces for attachment to said ram whereby the application of tilting moment to said mast assembly results in the application of a force couple to said pivot member tending to rotate said pivot member,
(d) means operatively connected to said pivot member for indicating rotation of said pivot member, and
(e) resilient yielding means connecting said pivot member to one of said attaching members for yieldingly resisting rotation of said pivot member relatively to said one attaching member until a predetermined tilting moment has been applied to said mast assembly.

5. A load indicating device comprising
(a) a pivot shaft having at least two cylindrical surfaces eccentric to each other,
(b) one of said cylindrical surfaces intermediate of said other cylindrical surfaces,
(c) a first load receiving member pivotally mounted on said intermediate cylindrical surface,
(d) a second load receiving member pivotally mounted on said other cylindrical surfaces whereby the application of a load to said first and second load receiving members in opposite directions will tend to rotate said pivot shaft, and
(e) resilient yielding means connecting said pivot shaft to one of said load receiving members for yieldingly resisting rotation of said pivot shaft relatively to said one load receiving member until a predetermined load has been applied to said load receiving members.

6. A load indicating device comprising
(a) a pivot shaft having at least two cylindrical surfaces eccentric to each other,
(b) one of said cylindrical surfaces intermediate of said other cylindrical surfaces,
(c) a first load receiving member pivotally mounted on said intermediate cylindrical surface,
(d) a second load receiving member pivotally mounted on said other cylindrical surfaces whereby the application of a load to said first and second load receiving members in opposite directions will tend to rotate said pivot shaft,
(e) means operatively connected to said pivot shaft for indicating rotation of said pivot shaft, and
(f) resilient yielding means connecting said pivot shaft to one of said load receiving members for yieldingly resisting rotation of said pivot shaft relatively to said one load receiving member until a predetermined load has been applied to said load receiving members.

7. A load indicating device comprising
(a) a pivot shaft having at least two cylindrical surfaces eccentric to each other,
(b) one of said cylindrical surfaces intermediate of said other cylindrical surfaces,
(c) a first load receiving member pivotally mounted on said intermediate cylindrical surface,
(d) a second load receiving member pivotally mounted on said other cylindrical surfaces whereby the application of a load to said first and second load receiving members in opposite directions will tend to rotate said pivot shaft,
(e) a lever arm operatively connected to said pivot member for rotation by said pivot shaft,
(f) an electric switch operative by a predetermined rotation of said lever arm by said pivot shaft, and
(g) resilient yielding means connecting said pivot shaft to one of said load receiving members for yieldingly resisting rotation of said pivot shaft relatively to said one load receiving member until a predetermined load has been applied to said load receiving members.

8. A load indicating device comprising
(a) a pivot shaft having at least two cylindrical surfaces eccentric to each other,
(b) one of said cylindrical surfaces intermediate of said other cylindrical surfaces,
(c) a first load receiving member pivotally mounted on said intermediate cylindrical surface,
(d) a second load receiving member pivotally mounted on said other cylindrical surfaces whereby the application of a load to said first and second load receiving members in opposite directions will tend to rotate said pivot shaft,
(e) a lever arm having a hub portion surrounding said pivot shaft,
(f) adjustable means carried by said hub portion and engageable by means on said pivot member whereby rotation of said pivot shaft is transmitted to said lever arm,
(g) an electric switch operative by a predetermined rotation of said lever arm by said pivot shaft, and
(h) resilient yielding means connecting said pivot shaft to one of said load receiving members for yieldingly resisting rotation of said pivot shaft relatively to said load receiving member until a predetermined load has been applied to said load receiving members.

9. In an electric hoist having an electric motor and an electrical circuit for operation thereof,
(a) a pivot shaft having at least two cylindrical surfaces eccentric to each other,
(b) one of said cylindrical surfaces intermediate of said other cylindrical surfaces,
(c) attaching means pivotally mounted on said other cylindrical surfaces and attached to a part of the hoist,
(d) a hoist sheave rotatably mounted on said intermediate cylindrical surface whereby the application of a load to said sheave will tend to rotate said pivot shaft,
(e) an electric switch for said electric motor of said hoist operatively connected to said pivot member and operable by predetermined rotation of said pivot member to break said electric circuit to said motor, and
(f) resilient yielding means connecting said pivot shaft to said attaching means for yieldingly resisting rotation of said pivot shaft relatively to said attaching means until a predetermined load has been applied to said sheave.

10. In an electric hoist having an electric motor and an electrical circuit for operation thereof, (a) a pivot shaft having at least two cylindrical surfaces eccentric to each other,
(b) one of said cylindrical surfaces intermediate of said other cylindrical surfaces,
(c) attaching means pivotally mounted on said other cylindrical surface and attached to a pair of the hoist,
(d) a hoist sheave rotatably mounted on said intermediate cylindrical surface whereby the application of a load to said sheave will tend to rotate said pivot shaft,
(e) a lever arm operatively connected to said pivot shaft for rotation by said lever arm,
(f) an electric switch in said electrical circuit operable by predetermined rotation of said lever arm to break said electrical circuit to said motor, and
(g) resilient yielding means connecting said pivot shaft to said attaching means for yieldingly resisting rotation of said pivot shaft relatively to said attaching means until a predetermined load has been applied to said sheave.

References Cited by the Examiner
UNITED STATES PATENTS

| | | | |
|---|---|---|---|
| 1,945,712 | 2/34 | Wadd | 254—168 |
| 2,100,057 | 11/37 | Krebs. | |
| 2,335,568 | 11/43 | Lock | 254—168 |
| 2,588,018 | 3/52 | Laurenstein. | |
| 2,689,890 | 9/54 | Green | 254—173 |
| 2,751,994 | 6/56 | Remde | 187—9 |
| 2,815,927 | 12/57 | Howard | 254—168 |
| 2,867,841 | 1/59 | Baldauf. | |
| 2,966,068 | 12/60 | Christian | 254—168 X |
| 3,031,094 | 4/62 | Arnot | 214—674 |
| 3,032,221 | 5/62 | Carliss et al. | 214—673 |

SAMUEL F. COLEMAN, *Primary Examiner.*

HUGO O. SCHULZ, *Examiner.*